(12) United States Patent
Cedillo

(10) Patent No.: US 6,364,439 B1
(45) Date of Patent: Apr. 2, 2002

(54) COMPUTER STORAGE SYSTEMS FOR COMPUTER FACILITIES

(75) Inventor: Rudy Cedillo, Boise, ID (US)

(73) Assignee: Interland, Inc., Atlanta, GA (US)

( * ) Notice: Subject to any disclaimer, the term of this patent is extended or adjusted under 35 U.S.C. 154(b) by 0 days.

(21) Appl. No.: 09/540,907

(22) Filed: Mar. 31, 2000

(51) Int. Cl.⁷ .................................................. A47B 81/00

(52) U.S. Cl. ................................ 312/223.6; 312/265.4; 211/26

(58) Field of Search ........................... 312/223.6, 223.2, 312/223.3, 223.1, 265.1, 265.4, 257.1; 211/26, 182, 189, 191; 361/724, 725

(56) References Cited

U.S. PATENT DOCUMENTS

| | | | |
|---|---|---|---|
| 3,404,931 A | * 10/1968 | Fall et al. | 312/265.4 |
| 3,471,029 A | * 10/1969 | Dolan | 211/26 |
| 4,496,057 A | * 1/1985 | Zenitani et al. | 211/26 |
| 4,553,674 A | * 11/1985 | Yoshikawa et al. | 211/26 |
| 5,574,251 A | * 11/1996 | Sevier | 312/223.6 X |
| 5,683,001 A | * 11/1997 | Masuda et al. | 211/26 |
| 5,788,087 A | * 8/1998 | Orlando | 211/26 |
| 5,820,018 A | * 10/1998 | Stacy | 312/265.4 X |
| 5,957,556 A | * 9/1999 | Singer et al. | 312/223.6 |
| 6,193,339 B1 | * 2/2001 | Behl et al. | 312/223.2 |
| 6,202,860 B1 | * 3/2001 | Ledwig | 211/26 |

OTHER PUBLICATIONS

SMC brochure for "Colo Cabinet," (No Date Given).
Chatsworth Products, Inc. "Application Series" brochure, Aug. 1998.
SMC brochure "Presenting the Total Solution." Apr. 1999.
* cited by examiner Primary Examiner—James O. Hansen
(74) Attorney, Agent, or Firm—Perkins Coie LLP

(57) ABSTRACT

Computer facilities and computer storage systems for such facilities. In one embodiment, a computer storage system for a co-location computer facility comprises a rack, a first cable guard and at least a first computer storage unit. The rack can comprise a first upright having a first height and a second upright spaced laterally apart from the first upright. The cable guard can be attached to the first upright, and the cable guard can be an enclosure extending along the first upright for at least a portion of the first height of the rack. The cable guard can also include a lockable door on a first side of the enclosure. The first computer storage unit can have several different configurations. In one embodiment, the first computer storage unit comprises a first rigid case removably attached to the first and second uprights, a first door movably attached to the first case, and a first lock attached to the first door. The first case generally has a second height less than the first height of the first upright. In other embodiments, the computer storage system can also include a second computer storage unit having a second rigid case removably attached to the first and second uprights, a second door movably attached to the second case, and a second lock attached to the second door. The second case, for example, can have a height less than the first height of the first upright, and the second computer storage unit is separate from the first computer storage unit.

42 Claims, 4 Drawing Sheets

COMPUTER STORAGE SYSTEMS FOR COMPUTER FACILITIES

TECHNICAL FIELD

The following relates to operating computer facilities that provide secure storage, high-speed data connections, and uninterrupted power supplies for a plurality of computers at a common site.

BACKGROUND

Businesses and other entities typically have one or more high-speed, high-capacity servers for processing/storing data and networking personal computers. In a typical application, a large entity or hosting operation has a computer facility with one or more ventilated cabinets, a cooling system, a power supply, and a high-speed data connection. Such a complex facility, however, can be prohibitively expensive for e-commerce or other small businesses that require a high-speed data connection and a 24-hour uninterrupted power supply.

Co-location computer facilities provide small businesses many of the same advantages of a full-service computer facility at a fraction of the cost of owning and operating such a facility. A typical co-location facility has a computer room with a high-speed data connection, an uninterrupted power supply, a cooling system, and a plurality of individual cabinets with individual locks. Individual businesses lease cabinet space in one or more cabinets from a co-location operator for housing their servers, communications equipment, and other related equipment. Each individual client accordingly has a key to only its own cabinet such that its equipment and data are protected from theft or vandalism.

One specific cabinet system for co-location facilities is manufactured by SMC, a wholly-owned subsidiary of Fisher Hamilton LLC, of Conklin, N.Y. SMC manufactures "CoLo" cabinets that come in single compartment, two-compartment or three-compartment configurations. The SMC CoLo cabinets generally have a total height of 83 inches and a separate locking door for each compartment. The single compartment cabinet accordingly has one large door for the full height of the cabinet, and it has several individual shelves or racks internally within the compartment. The two-compartment or three-compartment SMC cabinets may also have individual shelves within each compartment. The two-compartment SMC cabinet has an upper compartment separated from a lower compartment by a perforated divider shelf that is shared by both compartments. The three-compartment SMC cabinet has an upper perforated divider shelf separating the upper compartment from the middle compartment, and a lower perforated divider shelf separating the lower compartment from the middle compartment. Each divider shelf in the three-compartment SMC cabinet is accordingly shared by two adjacent compartments. Although the SMC cabinets adequately protect the individual servers of particular customers, these cabinet systems suffer from several drawbacks.

One drawback of conventional co-location cabinet systems is that they inefficiently use the limited space at a co-location facility. Co-location operators generally install the high-speed data connections, the uninterrupted power supplies, and the cabinet systems in a facility before they have customers to lease all of the cabinet space. The co-location operators accordingly need to estimate the number of single compartment, two-compartment and three-compartment cabinets they will need to accommodate future customers, but their estimates are frequently incorrect because the size of the servers and the requirements of the customers continually change. As a result, many co-location operators have several vacant cabinets, or some of the large cabinets are underutilized by housing only a small sever. Therefore, conventional co-location cabinet systems may not provide an efficient use of space in a co-location computer facility.

Another drawback of conventional co-location cabinet systems is that the cabling for the high-speed data connections and the wiring for the power supply generally need to be installed before installing the cabinet systems. As a result, the cabling and wiring installed when the computer room was constructed may further limit the flexibility of changing a particular cabinet configuration or accommodating different clients. Conventional co-location cabinet systems accordingly limit the ability to configure the cabinets according to the particular requirements of a changing marketplace.

Still another drawback of conventional co-location cabinet systems is that they are relatively expensive. For example, each SMC CoLo cabinet can cost between $1,800–$2,500. Therefore, it requires a significant capital investment to provide a co-location facility that can handle hundreds of individual customers.

SUMMARY

The invention is directed toward computer facilities and computer storage systems for such facilities. In one embodiment, a computer storage system for a co-location computer facility comprises a rack, a first cable guard and at least a detachable first computer storage unit or compartment. The rack can comprise a first upright having a first height and a second upright spaced laterally apart from the first upright. The first cable guard can be attached to one of the first or second uprights, or the first cable guard can be integral with one of the first or second uprights. The first cable guard can accordingly be defined by an enclosure extending along at least a portion of the first height. The first cable guard can also include a lockable door on a first side of the enclosure.

The first computer storage unit can have several different configurations. In one embodiment, the first computer storage unit comprises a first rigid case attached to the first and second uprights, a first door movably attached to the first case, and a first lock attached to the first door. The first case generally has a second height less than the first height of the first upright, and the first case can be detached from the first and second uprights. In other embodiments, the computer storage system can also include a second computer storage unit having a second rigid case removably attached to the first and second uprights, a second door movably attached to the second case, and a second lock attached to the second door. The second case, for example, can have a height less than the first height of the first upright, and the second computer storage unit is separate from the first computer storage unit. Each of the first and second cases can also include a locking back door to provide access to the back panel of the servers.

In a typical co-location facility, the computer storage system has at least one rack and a plurality of separate computer storage units removably attached to the rack. The computer storage units are generally spaced apart from each other by small gaps such that adjacent storage units do not share a common wall or panel. As a result, the computer storage system can be configured and reconfigured by attaching and detaching the appropriate computer storage units to a rack to accommodate the particular requirements of the market conditions at a co-location facility. Additional racks with additional computer storage units can also be added to a co-location facility to expand the capacity for providing additional storage space. Therefore, several embodiments of co-location computer storage systems provide co-location facility operators the ability to configure their computer storage units and racks as they obtain clients so that they can efficiently use the space in their computer room.

DETAILED DESCRIPTION

The following describes computer storage systems for computer facilities, and methods for installing and using such computer storage systems. Specific details of several embodiments are described below with reference to co-location computer facilities to provide a thorough understanding of such embodiments. The present invention, however, can also be practiced in hosting computer facilities and other types of computer facilities. A person skilled in the art will thus understand that the invention may have additional embodiments, or that the invention may be practiced without several of the details described below.

Figure 1:
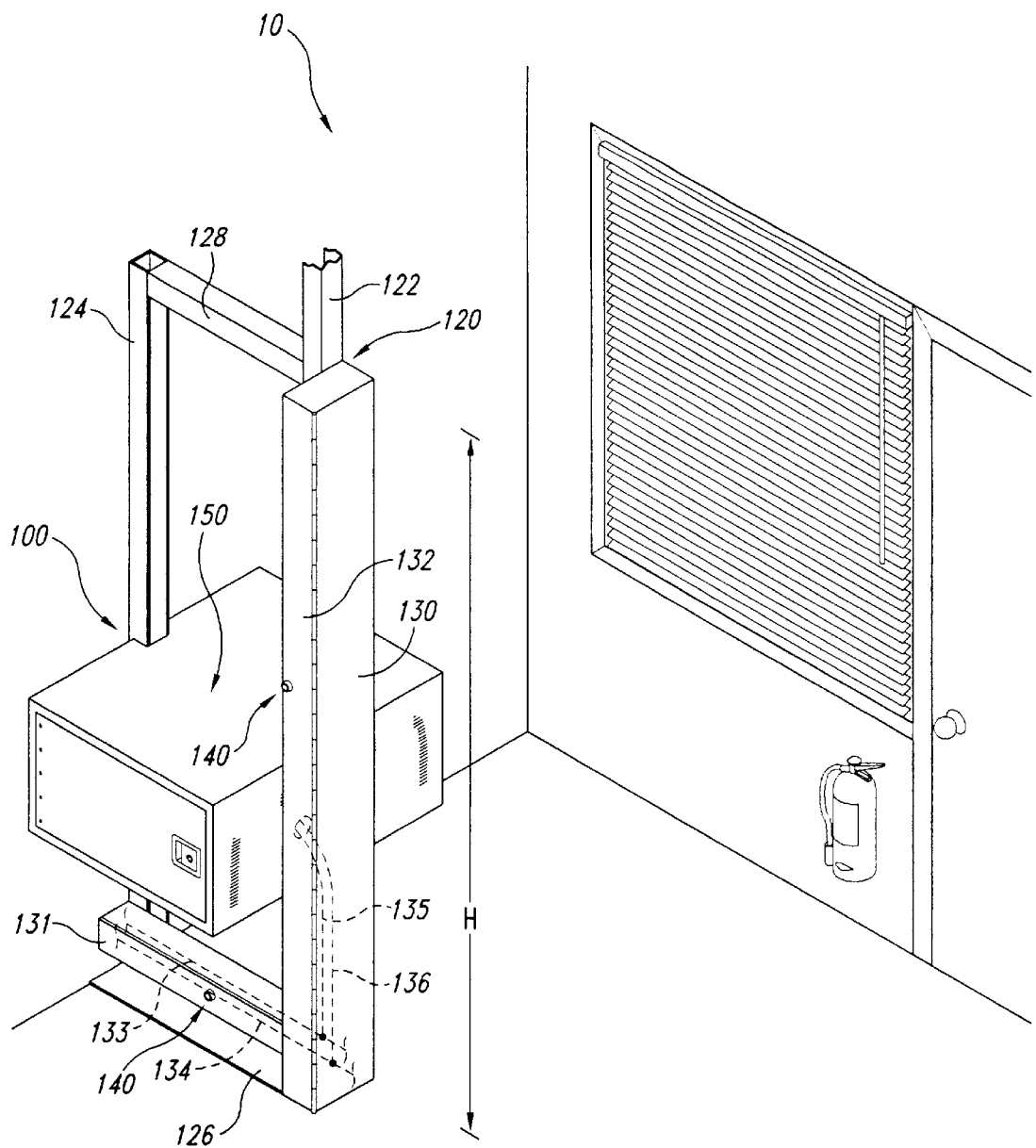
FIG. 1 is an isometric view of a computer storage system for a computer facility in accordance with one embodiment of the invention.

FIG. 1 is an isometric view of a computer facility 10 having a computer storage system 100 in accordance with one embodiment of the invention. The embodiment of the computer storage system 100 shown in FIG. 1 has a rack 120 and a first computer storage unit 150 attached to the rack 120. The particular embodiment of the computer storage system 100 shown in FIG. 1 has only single a computer storage unit 150, but other embodiments of the computer storage system described below illustrate that each rack 120 can carry a plurality of computer storage units having different sizes. The computer storage unit 150 is a modular compartment that securely houses a server (not shown in FIG. 1) of a particular co-location client. As explained in more detail below, the computer storage unit 150 is separately attached to the rack 120 by bolts or other types of fasteners so that it can be attached to or detached from the rack 120 independently of other computer storage units. A plurality of computer storage units can accordingly be configured on the rack 120 to accommodate the particular requirements of the co-location facility in a manner that provides an efficient use of space.

The rack 120 can have a first upright 122 and a second upright 124 spaced laterally apart from the first upright. In this embodiment, the first upright 122 has a first height H extending from the floor to the ceiling of the co-location facility 10, and the second upright 124 is attached to a wall of the co-location facility 10. The second upright 124 shown in FIG. 1 is shorter than the first upright 122, but in other embodiments the second upright 124 can have the same height as the first upright 122. The rack 120 can also include a first cross-member 126 and a second cross-member 128. The first cross-member 126 can be attached to a lower portion of the first and second uprights 122 and 124, and the second cross-member 128 can be attached to an upper portion of the first and second uprights 122 and 124. The rack 120 provides a fixed frame to which a number of separate computer storage units 150 can be attached for configuring the computer storage system 100 according to the particular requirements of the co-location facility 10.

The computer storage system 100 can also include a first cable guard 130 and a second cable guard 131. The first cable guard 130 can be attached to either the first upright 122 or the second upright 124, and the second cable guard 131 can be attached to either the first cross-member 126 or the second cross-member 128. In the embodiment shown in FIG. 1, the first cable guard 130 is attached to the first upright 122 and the second cable guard 131 is attached to the first cross-member 126. The cable guards 130 and 131 can each include a door 132 to provide access to an enclosed space for protecting cables and wiring. The rack 120 and the cable guards 130/131 can operate together to provide a high-speed network cable and a power supply line to the computer storage unit 150.

In one embodiment a communications cable 133 and a separate power line 134 are housed in the second cable guard 131, and separate jumper cables 135 and 136 can be coupled to the communications cable 133 and the power line 134, respectively. The jumper cables 135 and 136 run through the first cable guard 130 to the computer storage unit 150. A co-location facility operator can accordingly install a server in the computer storage unit 150 by opening the door 132 of the first cable guard 130 and pulling the jumper cables 135 and 136 through the first cable guard 130. The first and second cable guards 130 and 131 can also include locks 140 to prevent unauthorized access to the network cable 133, the power supply line 134, and the jumper cables 135 and 136. As such, individual co-location customers cannot access any cables or lines that are not terminated within their own computer storage unit.

Figure 2A:
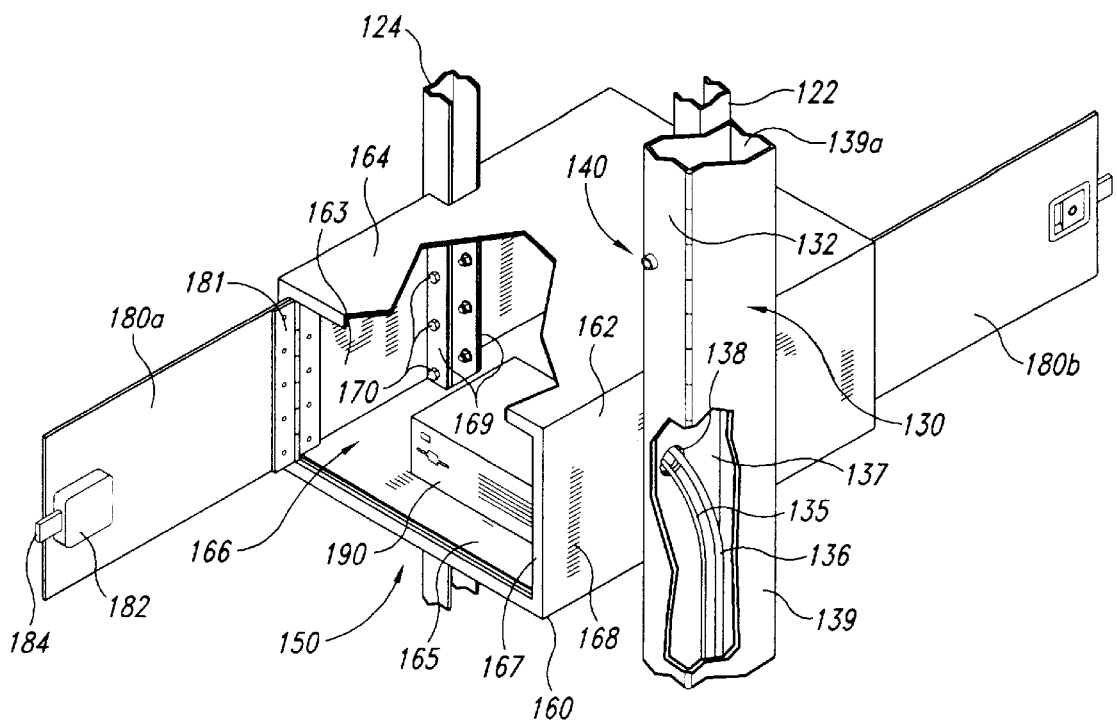
FIGS. 2A and 2B are isometric views of a rack and a computer storage unit for a computer storage system in accordance with an embodiment of the invention.
Figure 2B:
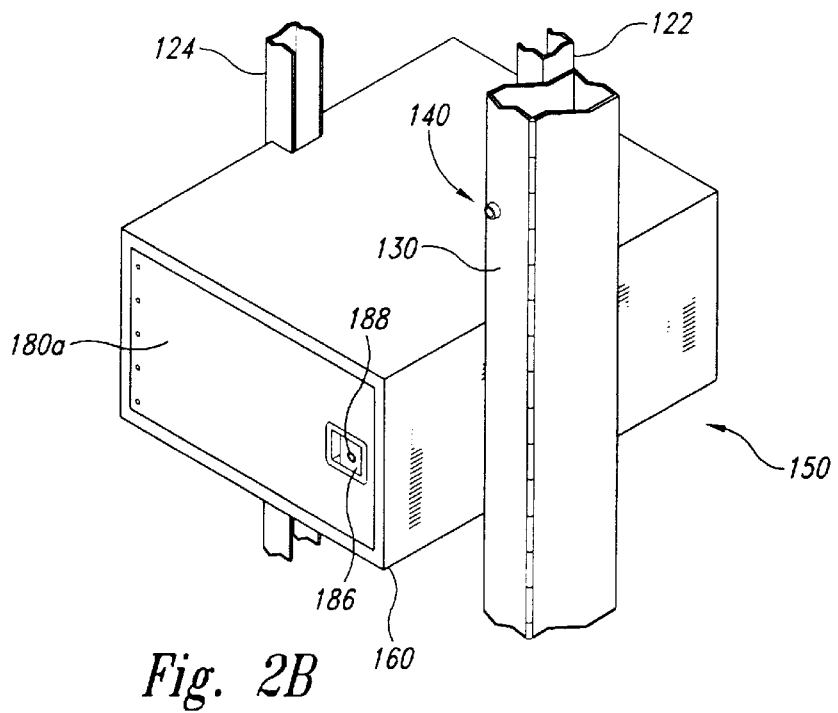

FIGS. 2A and 2B are isometric views illustrating the computer storage unit 150 and the first cable guard 130 of this embodiment in more detail. Referring to FIG. 2A, the computer storage unit 150 can include a rigid case 160, a front door 180a, and a back door 180b. The case 160 can have a first side panel 162, a second side panel 163, a top panel 164, and a bottom panel 165 that together define a cavity 166 for holding a server 190 of a co-location customer. The panels 162–165 of the case 160 are generally sheet metal panels that have vents 168 to provide air circulation in the computer storage unit 150. The panels 162–165 can alternatively be made from other materials, and the case 160 can alternatively have other sizes and shapes. The case 160 can also include a door flange 167 at the front and rear faces of the case 160, and mounting flanges 169 at interior sections on each side of the case 160. A plurality of releasable fasteners 170, such as bolts, screws or pins, pass through holes in the mounting flanges 169 and the first and second uprights 122 and 124 to removably attach the computer storage unit 150 to the rack 120.

The front and back doors 180a and 180b are pivotally attached to the case 160 by hinges 181 (only one hinge shown). The doors 180a and 180b are generally made from plexiglass or other transparent or semi-transparent materials that are strong and shatter proof. The doors 180a and 180b can alternatively be made from sheet metal, wood or other materials. Each door 180a and 180b includes a lock assembly 182 having an interlocking element 184 (shown in FIG. 2A only) and a handle 186 (shown in FIG. 2B only). The handle 186 moves the interlocking element 184 between a release position and a lock position. The lock assembly 182 also has a lock cylinder 188 that rotates to a lock position for preventing the handle 186 from moving the interlocking element 184. In operation, the interlocking element 184 of the front door 180a engages an interior surface of the door flange 167 to hold the front door 180a in a closed position (FIG. 2B). An individual co-location client with the key to the lock cylinder 188 can then lock the handle 186 to prevent unauthorized access to the computer storage unit 150. Each computer storage unit 150 has a separate key and lock cylinder 188 such that one co-location client's server is not accessible to other co-location clients.

FIG. 2A also illustrates a cutaway portion of an embodiment of the first cable guard 130. In this embodiment, the first cable guard 130 is an enclosure having a first wall defined by the door 132, a second wall 137 having an aperture 138, a third wall 139 opposite the second wall 137, and a rear wall 139a. The first cable guard 130 shown in FIG. 2A is attached to the first upright 122, but the cable guard can alternatively be an enclosed interior portion of the first upright 122 itself. The first cable guard 130 accordingly defines an enclosure extending along at least a portion of the first height. The communication jumper cable 135 and the power supply jumper cable 136 pass through the aperture 138 in the second wall 137 to terminate in the cavity 166 of the computer storage unit 150.

Figure 3:
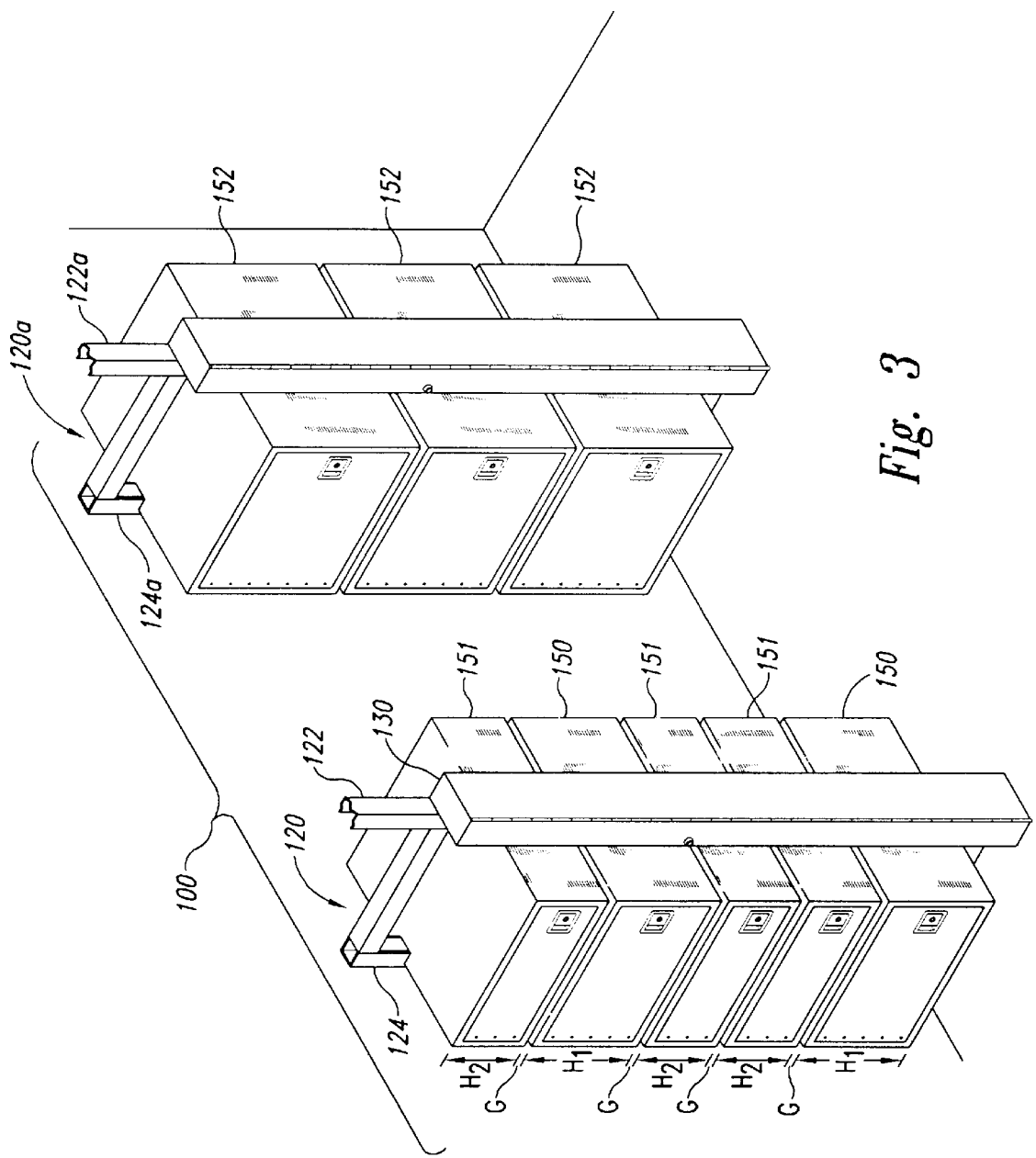
FIG. 3 is an isometric view of a computer facility with a computer storage system in accordance with an embodiment of the invention.

FIG. 3 is an isometric view showing an installation of the computer storage system 100 having a plurality of racks 120/120a and a plurality of separate computer storage units 150–152. The components for the racks 120/120a and the components for the computer storage units 150–152 are premanufactured for purchase by a co-location operator. The co-location operator initially installs at least a first rack 120 having the first and second uprights 122 and 124. The co-location operator then attaches a number of separate computer storage units 150, 151 and/or 152 to the first rack 120 according to the specific requirements of the co-location facility. In the particular embodiment illustrated in FIG. 3, two medium sized computer storage units 150a–b and three small computer storage units 151a–c are attached to the first rack 120. Each of the computer storage units 150 and 151 have a height $H_1$ or $H_2$ less than the first height H (FIG. 1) of the first upright 122. Additionally, the computer storage units 150 and 151 are individually attached to the first and second uprights 122 and 124 of the first rack 120 such that the computer storage units 150 and 151 do not share a common panel. For example, the computer storage units 150 and 151 are generally attached to the first and second uprights 122 and 124 so that there is a small gap G between each adjacent storage unit. The computer storage units 150 and 151 can also be detached from the first and second uprights 122 and 124 to reconfigure the computer storage system 100. As such, the computer storage units are "removably attached" to the rack.

The co-location operator can also install additional racks in a computer room to expand the capacity for adding more computer storage units. The computer storage system 100 shown in FIG. 3 can also include a second rack 120a and three large computer storage units 152 removably attached to the second rack 120a. The computer storage system 100 can accordingly have a plurality of racks that can be constructed by the co-location operator as the need for more capacity arises.

The particular configurations of computer storage units 150–152 illustrated in FIG. 3 can be changed according to the requirements of the computer facility. The computer storage units 150–152, for example, can either be larger or smaller than those illustrated in FIG. 3, or they can have different shapes. Also, because the computer storage units 150–152 can be detached from the racks 120/120a, the computer storage system 100 can be configured and re-configured according to the particular requirements of the co-location facility to efficiently use both the rack space and the floor space.

Figure 4:
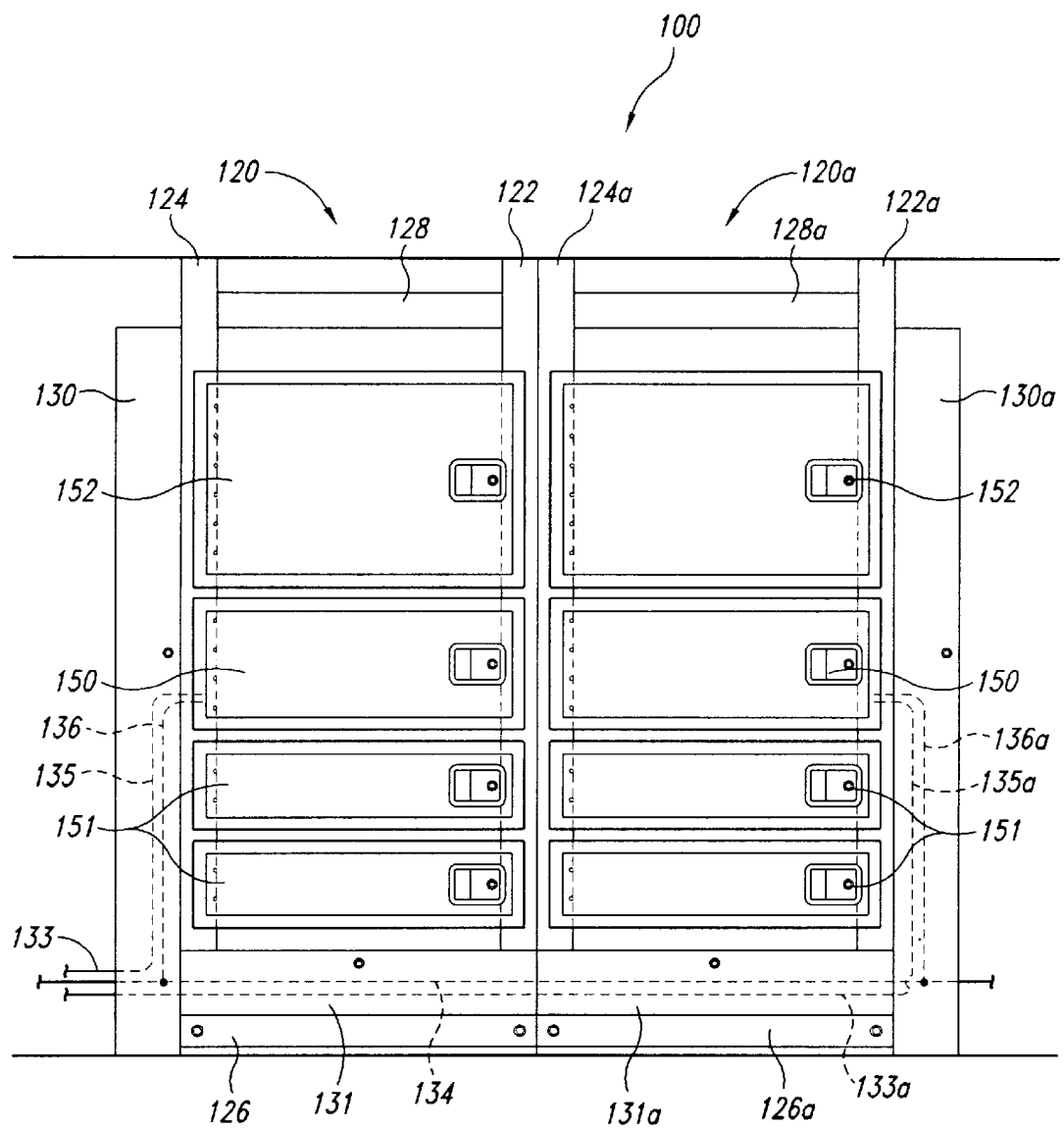
FIG. 4 is a front elevation view of a computer storage system for a computer facility in accordance with another embodiment of the invention.

FIG. 4 is a front elevation view of another embodiment of the computer storage system 100 having a first rack 120 and a second rack 120a attached directly to the first rack 120. The first rack 120 has similar components to the first rack 120 described above with reference to FIGS. 1–3, and like reference numbers refer to like components. The second rack 120a in this embodiment is attached directly to the first rack 120 to define a row of racks with computer storage units 150–152. In a typical application, the first upright 122 of the first rack 120 is attached to the second upright 124a of the second rack 120a. The second rack 120a can be constructed to hold additional computer storage units 150–152 when the computer facility needs to add capacity to accommodate additional servers.

The first cross-members 126 and 126a of the first and second racks 120 and 120a can each have a second cable guard 131 to house the connectivity cable 133 and power supply line 134. As such, the connectivity cable 133 and the power supply line 134 can run across both the first and second racks 120 and 120a. A co-location operator can accordingly provide the data connection and the power supply to each subsequent rack without having to install these lines when the computer room was initially constructed. The co-location operators can thus expand the capacity of their facilities in increments according to the particular requirements of new customers, or the co-location operators can reconfigure their computer storage systems by detaching certain computer storage units from one rack and reattaching them to other racks.

Several embodiments of the computer storage system 100 provide a modular system that can be configured for efficiently using the space in a computer room. The racks 120 of the computer storage system 100 can be constructed as the co-location operator requires more storage space. Moreover, unlike fixed computer cabinets with one or more compartments, the computer storage units 150–152 can be attached to and/or detached from the racks to increase the density of compartments for housing servers. A co-location operator, for example, can keep a small inventory of computer storage units 150–152 having different sizes and then attach the storage units to the racks as the storage units are leased. A co-location operator can also reconfigure the arrangement of the computer storage units 150–152 on the racks. As a result, co-location operators are not limited by their initial estimates of the marketplace because the modularity of the computer storage system 100 allows co-location operators the flexibility to develop their configurations over time or even change the configuration according to market conditions.

Several embodiments of the computer storage system 100 shown above are also expected to provide more flexibility and security in wiring the computer storage units 150–152. The first and second cable guards 130 and 131, for example, provide easy access for the co-location operator to install and maintain the high-speed connection cables and the power supply lines, and they also protect these items from vandalism or damage by the co-location tenants. Therefore, certain embodiments of the computer storage system 100 are expected to provide more flexibility in wiring the racks and a high level of security.

The embodiments of the computer storage system 100 shown above are also expected to be relatively inexpensive compared to existing cabinet systems. The computer storage system 100 is generally less complicated than a fixed cabinet system because the racks and the computer storage units are assembled by the co-location operator. As a result, the computer storage system 100 is expected to be less expensive to assemble and install. Moreover, because the components of the computer storage system 100 are modular, it is expected that co-location operators will generally have enough equipment to handle their existing customers and a reasonable amount of growth. This is expected to reduce the number of storage units the are vacant compared to conventional cabinet systems.

From the foregoing it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A computer storage system comprising:
   a rack comprising a first upright having a first height and a second upright spaced laterally apart from the first upright;
   a first cable guard having an enclosure extending along the first upright for at least a portion of the first height and a lockable door on a first side of the enclosure; and
   a first computer storage unit having a first rigid case removably attached to the first and second uprights, a first door movably attached to the first case, and a first lock attached to the first door to lock the first door in a closed position, wherein the first case has a second height less than the first height of the first upright.

2. The computer storage system of claim 1, further comprising a second computer storage unit having a second rigid case removably attached to the first and second uprights, a second door movably attached to the second case, and a second lock attached to the second door to lock the second door in a closed position, wherein the second case has a height less than the first height of the first upright, and wherein the second computer storage unit is separate from the first computer storage unit.

3. The computer storage system of claim 2 wherein:
   the first case of the first computer storage unit comprises a top panel, a bottom panel, and first and second side panels between opposing ends of the top and bottom panels; and
   the second case of the second computer storage unit comprises a top panel, a bottom panel, and first and second side panels between opposing ends of the top and bottom panels, the top panel of the second computer storage unit being spaced apart from the bottom panel of the first computer storage unit by a gap.

4. The computer storage system of claim 3 wherein the first and second computer storage units have different sizes.

5. The computer storage system of claim 3 wherein the first and second computer storage units have the same size.

6. The computer storage system of claim 3, further comprising a plurality of detachable fasteners, each fastener being coupled to one of the first and second computer storage units and one of the first and second uprights to removably attach the first and second computer storage units to the first and second uprights.

7. The computer storage system of claim 1 wherein the rack further comprises first and second cross-members, the first cross-member extending between one portion of the first and second uprights and the second cross-member extending between another portion of the first and second uprights.

8. The computer storage system of claim 7, further comprising a second cable guard extending along the first cross-member to house a power supply line and a network cable.

9. The computer storage system of claim 1 wherein the first cable guard is defined by a cavity in the first upright.

10. A computer storage system comprising:
    a rack comprising a first upright having a first height and a second upright spaced laterally apart from the first upright;
    a first computer storage unit having a first rigid case removably attached to the first and second uprights, a first front door movably attached to a front side of the first case, and a first front lock attached to the first front door to lock the first front door in a closed position, a first back door moveably attached to a backside of the case, a first back lock attached to the first back door to lock the first back door in a closed position, wherein the first case has a second height less than the first height of the first upright; and
    a second computer storage unit having a second rigid case removably attached to the first and second uprights, a second front door movably attached to a front side of the second case, and a second front lock attached to the second front door to lock the second front door in a closed position, a second back door moveably attached to a backside of the case, a second back lock attached to the second back door to lock the second back door in a closed position, wherein the second case has a height less than the first height of the first upright, and wherein the second computer storage unit is separate from the first computer storage unit.

11. The computer storage system of claim 10 wherein:
    the first case of the first computer storage unit comprises a top panel, a bottom panel, and first and second side panels between opposing ends of the top and bottom panels; and
    the second case of the second computer storage unit comprises a top panel, a bottom panel, and first and second side panels between opposing ends of the top and bottom panels, the top panel of the second computer storage unit being spaced apart from the bottom panel of the first computer storage unit by a gap.

12. The computer storage system of claim 10 wherein the first and second computer storage units have different sizes.

13. The computer storage system of claim 10 wherein the first and second computer storage units have the same size.

14. The computer storage system of claim 10 wherein the rack further comprises first and second cross-members, the first cross-member extending between one portion of the first and second uprights and the second cross-member extending between another portion of the first and second uprights.

15. The computer storage system of claim 14, further comprising a cable guard extending along the first cross-member to house a power supply line connection and a network cable.

16. A computer storage system comprising:
   a rack comprising a first upright having a first height and a second upright spaced laterally apart from the first upright; and
   a plurality of separate computer storage units spaced apart from one another along at least a portion of the first height of the first upright such that immediately adjacent computer storage units do not share a common panel, each computer storage unit comprising a rigid case removably attached to the first and second uprights, a front door movably attached to a front side of the case, and a front lock attached to the front door to lock the front door in a closed position, a back door moveably attached to a backside of the case, and a back lock attached to the back door to lock the back door in a closed position, wherein each case has a height less than the first height of the first upright.

17. The computer storage system of claim 16 wherein the plurality of computer storage units comprises:
   a first computer storage unit having a first rigid case removably attached to the first and second uprights, a first door movably attached to the first case, and a first lock attached to the first door to lock the first door in a closed position; and
   a second computer storage unit having a second rigid case removably attached to the first and second uprights, a second door movably attached to the second case, and a second lock attached to the second door to lock the second door in a closed position, wherein the second computer storage unit is separate from the first computer storage unit.

18. The computer storage system of claim 17 wherein:
   the first case of the first computer storage unit comprises a top panel, a bottom panel, and first and second side panels between opposing ends of the top and bottom panels; and
   the second case of the second computer storage unit comprises a top panel, a bottom panel, and first and second side panels between opposing ends of the top and bottom panels, the top panel of the second computer storage unit being spaced apart from the bottom panel of the first computer storage unit by a gap.

19. The computer storage system of claim 18 wherein the first and second computer storage units have different sizes.

20. The computer storage system of claim 18 wherein the first and second computer storage units have the same size.

21. A computer facility, comprising:
   a computer storage system comprising
      a rack comprising a first upright having a first height and a second upright spaced laterally apart from the first upright;
      a first cable guard attached to the first upright, the first cable guard having an enclosure extending along the first upright for at least a portion of the first height and a lockable door on a first side of the enclosure; and
      a first computer storage unit having a first rigid case removably attached to the first and second uprights, a first door movably attached to the first case, and a first lock attached to the first door to lock the first door in a closed position, wherein the first case has a second height less than the first height of the first upright; and
   a first computer in the first computer storage unit.

22. The computer facility of claim 21, further comprising a second computer storage unit having a second rigid case removably attached to the first and second uprights, a second door movably attached to the second case, and a second lock attached to the second door to lock the second door in a closed position, wherein the second case has a height less than the first height of the first upright, and wherein the second computer storage unit is separate from the first computer storage unit.

23. The computer facility of claim 22 wherein:
   the first case of the first computer storage unit comprises a top panel, a bottom panel, and first and second side panels between opposing ends of the top and bottom panels; and
   the second case of the second computer storage unit comprises a top panel, a bottom panel, and first and second side panels between opposing ends of the top and bottom panels, the top panel of the second computer storage unit being spaced apart from the bottom panel of the first computer storage unit by a gap.

24. The computer facility of claim 23 wherein the first and second computer storage units have different sizes.

25. The computer facility of claim 23 wherein the first and second computer storage units have the same size.

26. A computer facility, comprising:
   a computer storage system comprising
      a rack comprising a first upright having a first height and a second upright spaced laterally apart from the first upright;
      a first computer storage unit having a first rigid case removably attached to the first and second uprights, a first door movably attached to the first case, and a first lock attached to the first door to lock the first door in a closed position, wherein the first case has a second height less than the first height of the first upright; and
      a second computer storage unit having a second rigid case removably attached to the first and second uprights, a second door movably attached to the second case, and a second lock attached to the second door to lock the second door in a closed position, wherein the second case has a height less than the first height of the first upright, and wherein the second computer storage unit is separate from the first computer storage unit; and
   a first computer in the first computer storage unit and a second computer in the second computer storage unit.

27. The computer facility of claim 26 wherein:
   the first case of the first computer storage unit comprises a top panel, a bottom panel, and first and second side panels between opposing ends of the top and bottom panels; and
   the second case of the second computer storage unit comprises a top panel, a bottom panel, and first and second side panels between opposing ends of the top and bottom panels, the top panel of the second computer storage unit being spaced apart from the bottom panel of the first computer storage unit by a gap.

28. The computer facility of claim 26 wherein the first and second computer storage units have different sizes.

29. The computer facility of claim 26 wherein the first and second computer storage units have the same size.

30. The computer facility of claim 26 wherein the rack further comprises first and second cross-members, the first cross-member extending between one portion of the first and second uprights and the second cross-member extending between another portion of the first and second uprights.

31. The computer facility of claim 30, further comprising a cable guard extending along the first cross-member to house a power supply line connection and a network cable.

32. A computer facility, comprising:

a computer storage system comprising a rack comprising a first upright having a first height and a second upright spaced laterally apart from the first upright;

a plurality of separate computer storage units spaced apart from one another along at least a position of the first height of the first upright such that immediately adjacent housings do not share a common on wall, each computer storage unit comprising a rigid case removably attached to the first and second uprights, a door movably attached to the case, and a lock attached to the door to lock the door in a closed position, wherein each case has a second height less than the first height of the first upright; and a computer in at least one of the computer storage units.

33. The computer facility of claim 32 wherein the plurality of computer storage units comprises:

a first computer storage unit having a first rigid case removably attached to the first and second uprights, a first door movably attached to the first case, and a first lock attached to the first door to lock the first door in a closed position; and a second computer storage unit having a second rigid case removably attached to the first and second uprights, a second door movably attached to the second case, and a second lock attached to the second door to lock the second door in a closed position, wherein the second computer storage unit is separate from the first computer storage unit.

34. The computer facility of claim 33 wherein:

the first case of the first computer storage unit comprises a top panel, a bottom panel, and first and second side panels between opposing ends of the top and bottom panels; and the second case of the second computer storage unit comprise s a top panel, a bottom panel, and first and second side panels between opposing ends of the top and bottom panels, the top panel of the second computer storage unit being spaced apart from the bottom panel of the first computer storage unit by a gap.

35. The computer facility of claim 34 wherein the first and second computer storage units have different sizes.

36. The computer facility of claim 34 wherein the first and second computer storage units have the same size.

37. A method of installing a computer facility, comprising:

constructing a rack comprising a first upright having a first height and a second upright spaced laterally apart from the first upright;

mounting a first computer storage unit to the first and second uprights, the first computer storage unit being releasably attached to the first and second uprights;

mounting a second computer storage unit to the first and second uprights, the second computer storage unit being separate from the first computer storage unit, and the second computer storage unit being releasably attached to the first and second uprights;

locking a first computer in the first computer storage unit; and locking a second computer in the second computer storage unit.

38. The method of claim 37, further comprising:

detaching the first computer storage unit from the rack;

mounting a third computer storage unit to the rack; and installing a server in the third computer storage unit.

39. The method of claim 37, further comprising detaching the first computer storage unit from the rack.

40. A method of installing a computer facility, comprising:

constructing a rack comprising a first upright having a first height and a second upright spaced laterally apart from the first upright;

mounting a first computer storage unit to the first and second uprights, the first computer storage unit being releasably attached to the first and second uprights, and the first computer storage unit having a first door and a first lock to the first door in a locked position; and mounting a second computer storage unit to the first and second uprights above or below the first computer storage unit, the second computer storage unit being separate from the first computer storage unit, the second computer storage unit being releasably attached to the first and second uprights, and the second computer storage unit having a second door and a second lock to lock the second door in a locked position.

41. The method of claim 40, further comprising:

detaching the first computer storage unit from the rack;

mounting a third computer storage unit to the rack; and installing a server in the third computer storage unit.

42. The method of claim 40, further comprising detaching the first computer storage unit from the rack.

* * * * *